United States Patent Office 3,814,689
Patented June 4, 1974

3,814,689
POLYFLUOROALKYL-DIMETHYL POLYSILOXANE/POLYOL ALIPHATIC ESTER GREASES
John B. Christian, Yellow Springs, Ohio, assignor to Aerospace Lubricants, Inc., Columbus, Ohio
No Drawing. Filed Mar. 13, 1973, Ser. No. 340,657
Int. Cl. C10m 7/50
U.S. Cl. 252—21                9 Claims

ABSTRACT OF THE DISCLOSURE

Grease compositions comprising: a base fluid blend consisting of polyfluoroalkyl-dimethyl polysiloxane and polyol aliphatic ester oils with selected viscosities, pour points, and flash points; thickeners consisting of finely divided sodium montmorillonite clay in combination with a finely divided fluorinated ethylene and propylene copolymer or a tetrafluoroethylene polymer; and antimony dialkyldithiocarbamate. The grease compositions have good anti-wear and good extreme pressure characteristics at temperatures in the —65° F. to 350° F. range.

BACKGROUND OF THE INVENTION

The present invention relates to grease compositions and more particularly to a grease composition having good anti-wear, extreme pressure, and heat rejection properties.

A number of advantages are to be gained by using a grease in place of oil as a lubricant in power transmissions and gear boxes. For example, the use of a grease eliminates the need for a pump, oil lines, and other components necessary for recirculation of the oil. In the case of helicopter lubrication systems such components are a major problem during combat since the numerous oil lines, etc., make up a large target for enemy weapons. Battlefield experience shows that when such lines are punctured, the loss of oil leads to swift mechanical failure of the transmissions. A grease lubricated transmission, on the other hand, requires no oil lines, which themselves are susceptible to puncture, and should the transmission be punctured, the grease will not leak out as readily as an oil.

Another advantage of a grease lubricated transmission or gear box is that the bearings are independently lubricated by grease and are not dependent upon the grease contained in the gear box itself. This is an important point since experience has shown that the bearings in the transmission fail before the gears.

Still another advantage of grease compositions, particularly the ones of the present invention, is that they have a longer operating life than oils and require less maintenance than oil lubricants. This means that a considerable savings in maintenance costs may be had by the use of grease compositions in transmissions and gear boxes.

It is known that certain polyol aliphatic ester oils can be thickened to a grease consistency by sodium montmorillonite clays, and that by adding antimony dialkyldithiocarbamate the anti-wear and extreme pressure properties are improved. For example, in my U.S. Pat. No. 3,622,512, issued Nov. 23, 1971, there is disclosed a grease composition comprising a polyol aliphatic ester base fluid, a thickener of sodium montmorillonite clay or a mixture of sodium montmorillonite clay and fluorinated ethylene-propylene copolymer, and a solid lubricant of antimony dialkyldithiocarbamate or molybdenum disulfide. While such compositions have both good wear and good extreme pressure properties, testing in a gear fatigue tester showed that their heat rejection properties are not adequate for use in transmissions and gear boxes.

It is also disclosed in another of my patents, U.S. Pat. No. 3,642,626, issued Feb. 15, 1972, that grease compositions comprising polyfluoroalkyl-dimethyl polysiloxanes may be thickened by a fluorinated copolymer of ethylene and propylene. Antimony dialkyldithiocarbamate may also be incorporated into such a composition. While such a grease possesses good heat rejection properties, its wear properties are marginal making it unsuitable for use in transmissions and gear boxes.

Attempts to blend a polyol aliphatic ester and polyfluoroalkyl-dimethyl polysiloxane showed the two oils to be immiscible. While U.S. Pat. No. 3,445,385 indicates that stable mineral oil-silicone oil compositions can be prepared in the presence of an organophalic organoammonium bentonite, experience has shown that sodium montmorillonite clay, even though it will thicken a polyol aliphatic ester, will not thicken a polysiloxane oil to grease consistency. Without thickening to a proper consistency, grease compositions cannot be used to lubricate transmissions and gear boxes. Even then, a grease suitable for such uses must be stable, homogeneous, and have good anti-wear, extreme pressure, and heat rejection properties.

SUMMARY OF THE INVENTION

In accordance with the present invention, there are provided grease compositions with good anti-wear and good extreme pressure properties. These greases also have heat rejection and rheological properties which will allow them to lubricate transmissions and gear boxes, where previously only oil lubricants were able to function. Such greases are usable over the temperature range of —65° F. to 350° F. The grease compositions of the present invention have the following components:

(a) A polyol aliphatic ester having the formula

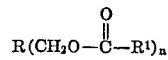

wherein R is a substituted alkane containing from 1 to 3 carbon atoms, and preferably containing 1 carbon atom, $R^1$ is an alkyl group having from 3 to 12 carbon atoms, preferably 5 to 10 carbon atoms, and most advantageously 9 carbon atoms, and $n$ is an integer having a value of 3 to 4; and preferably $n=4$;

(b) A polysiloxane base oil having the formula

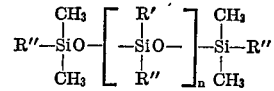

wherein R' is hydrogen or an aliphatic hydrocarbon radical having from 1 to 3 carbon atoms, R" is methyl, ethyl, vinyl, phenyl or —CH₂CH₂R in which R represents a perfluoro radical having 1–10 carbon atoms, at least half of the R" groups being —CH₂CH₂R, and $n$ is an integer having a value of from 1 to 150, preferably 40 to 150;

(c) A montmorillonite clay thickener;

(d) An additional thickener comprising either a fluorinated ethylene-propylene copolymer prepared by the copolymerization of perfluoro propylene and tetrafluoroethylene or a tetrafluoroethylene polymer; and (e) An extreme pressure and anti-wear additive such as

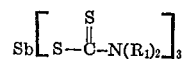

wherein $R_1$ is an alkyl group having from 1 to 12 carbon atoms, preferably 4 to 10 carbon atoms.

Accordingly, it is the object of the present invention to provide a grease composition having good anti-wear, extreme pressure, and heat rejection properties, such that it is suitable for use as a lubricant in transmissions and gear boxes.

DESCRIPTION OF THE PREFERRED EMBODIMENTS

The polyol aliphatic ester may be characterized by the general formula above and is further characterized by the following properties:

| | |
|---|---|
| Viscosity at 100° F. | About 25 to 35 centistokes. |
| Viscosity at 210° F. | About 4 to 6 centistokes. |
| Viscosity at −65° F. | About 17,000 to 98,000 centistokes. |
| Pour point | About −70 to −75° F. |
| Flash point | About 450 to 525° F. |

A polysiloxane preferred in the practice of this invention is trifluoropropylmethyl-dimethyl polysiloxane having the structural formula:

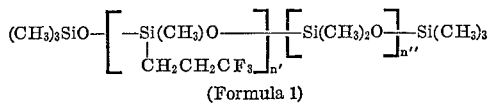

(Formula 1)

The two siloxane groups within the brackets can be in alternating order or at random or in series of similar repeating units with $n'$ and $n''$ representing integers of approximately the same value and totaling to the value of $n$. The preferred values for $n'$ and $n''$ are in the range of 20 to 75.

Another polysiloxane preferred for the practice of this invention has the formula:

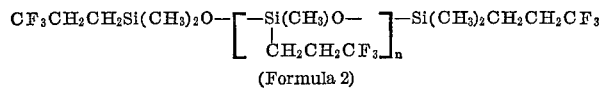

(Formula 2)

Other polysiloxanes embraced by the above general polysiloxane formula and suitable for use in the invention are disclosed in U.S. Pat. No. 2,961,425. For the purposes of this invention, the polysiloxane advantageously has a molecular weight and value of $n$ such as to give a viscosity of 50 to 100 centistokes, preferably 65 to 85 centistokes at 100° F.

The polysiloxanes useful in the practice of this invention may also be prepared according to the procedure of U.S. Pat. No. 2,961,425, and where the repeating units within the bracket of the formulas consist of two different siloxane radicals, these are derived by using a mixture of the siloxane compounds from which the repeating units are derived.

Other typical polysiloxanes useful in the practice of this invention include those having the following formulas:

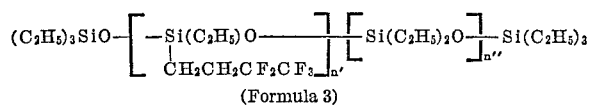

(Formula 3)

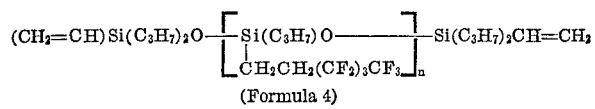

(Formula 4)

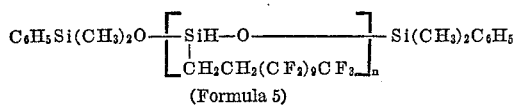

(Formula 5)

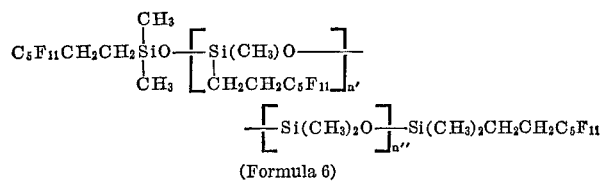

(Formula 6)

While the polysiloxane advantageously has a viscosity at 100° F. in the range of 50 to 100 centistokes, and preferably 65 to 85 centistokes, it is also desirable that the viscosity at various other temperatures be in the following ranges:

| | Centistokes |
|---|---|
| At 200° F. | 15–25 |
| At 0° F. | 650–725 |
| At −65° F. | 10,000–11,000 |

Other desirable properties include:

| | |
|---|---|
| Pour point | Below −80° F. |
| Flash point | Above 500° F. |
| Fire point | Above 600° F. |
| Four-Ball Wear Scar, 1200 r.p.m., 400° F., 40 kg. load, 2 hours, M–10 steel balls | No more than 1.3 mm. |

It is found that polysiloxanes having the formulas described above generally have these appropriate other properties when the viscosity at 100° F. is 65 to 85 centistokes.

A particularly effective polysiloxane, such as the trifluoropropyl-methyl-dimethyl polysiloxane (Formula 1) has the following properties:

| | |
|---|---|
| Viscosity at 100° F. | 75.2 centistokes. |
| Viscosity at 200° F. | 21.7 centistokes. |
| Viscosity at 0° F. | 692.2 centistokes. |
| Viscosity at −65° F. | 10,427.0 centistokes. |
| Pour point | Below −85° F. |
| Flash point | 555.0° F. |
| Fire point | 680.0° F. |
| Density | 1.136 g./cc. |
| Refractive index | 1.3851–1.3853. |
| Four-Ball Wear Scar, 1200 r.p.m., 400° F., 40 kg. load, 2 hours, M–10 steel balls | 1.295 m. |

The montmorillonite clay is finely divided having a surface area of about 15.9 m.²/gram, a particle size of about 0.75 to 1.0 micron, and a density of about 3.09 grams/cc.

The fluorinated ethylene-propylene copolymer is a copolymer of perfluoro propylene and tetrafluoro ethylene, preferably of equimolar amounts so that the copolymer preferably has the structural formula:

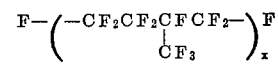

The copolymer has a molecular weight of 120,000 to 190,000, preferably 140,000 to 160,000, and advantageously one appropriate to give a density of 2.391 to 2.567 g./cc. The copolymer particles are of 0.5 to 0.25 micron size and give a minimum surface of 1.0 square meters per gram. The use of such a copolymer as a thickener is disclosed in U.S. Pat. No. 3,248,326.

The tetrafluoroethylene polymer, which may be used instead of the copolymer, has a molecular weight of 10,000 to 50,000, preferably 20,000 to 30,000, and advantageously one appropraite to give a density of 2.1 to 2.3 g./cc. The polymer particles are of 0.2 to 4.0 micron size and give a minimum surface area of 1.0 square meters per gram.

The antimony dialkyldithiocarbamate may be characterized by the formula:

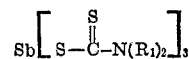

wherein $R_1$ is an alkyl group having from 1 to 12 carbon atoms, preferably 4 to 10 carbon atoms. The use of such an additive in extreme pressure lubricants is discussed in U.S. Pats. No. 3,139,405 and No. 3,239,462.

The grease composition of this invention has been found to perform in an extraordinarily good manner in helicopter transmissions; however, it may also be used in other power transmissions and gear boxes as well as being capable of use for other lubricating purposes. The preferred embodiments of the present invention are illustrated by the following examples, wherein parts and percentages are given by weight.

EXAMPLE I

A number of grease compositions are prepared by using the components and proportions indicated below in Tables I and II. The preferred method for preparing the greases is by mixing all of the polyol aliphatic ester and all of the montmorillonite clay in a suitable vessel (A) and heating to about 215° to 250° F. and maintaining at that temperature for about 30 minutes while continuously stirring. Then one-half of the fluorinated ethylene-propylene copolymer is added while continuing the stirring. The mixture is allowed to cool to room temperature (about 77° F.) while the stirring process is continued. By this time a thick slurry will have formed. In a second vessel (B) all of the polysiloxane fluid having Formula 1, all of the antimony diamyldithiocarbamate, and the other one-half of the fluorinated ethylene-propylene copolymer are mixed to a slurry by stirring. The contents of vessels (A) and (B) are thoroughly mixed and then passed through a suitable homogenizer set at a pressure of 5,000 to 7,000 p.s.i. (a Manton Gaulin Homogenizer has been found to be suitable). The mixture is passed through the homogenizer a sufficient number of times to produce a grease having an ASTM penetration of 290 to 300 decimilimeters. About 5 to 6 passes through the homogenizer is sufficient to result in a 290 to 300 ASTM penetration. A three-roll mill may also be used to homogenize the grease with equal results.

of the same standard. The heat rejection tests were conducted in a Sikorsky gear fatigue tester which is a four square regenerative rig using actual helicopter planetary gears. The transmission tests were conducted in actual Sikorsky S-61 intermediate and tail rotor helicopter transmissions. These results are also tabulated in Table I.

It will be noted from Table I that compositions B and G give the best results, and are the preferred compositions. A and F give the acceptable ranges. Compositions C, D, E, H, I and J are listed for comparative purposes. Compositions C, D, H and I had poor retention properties on the gear teeth and had rapid temperature rises which rendered them unsuitable for use in transmissions. Compositions, C, E, H and J had excessive antiwear properties (they allowed an excessive amount of wear on the gear teeth). Compositions C, D, E, H, I and J also failed to yield acceptable temperature stabilization levels. It is necessary that temperature stabilization be achieved below 300° F. within a maximum time of 5.1 hours. 300° F. temperature was reached and exceeded in a very short time with these greases. This indicates inadequate heat rejection properties. Full scale transmission tests were not conducted on the greases of C, D, E, H, I and J because of their failure to meet these heat stabilization requirements. Only compositions B and G, which are within the ranges given in A and F, were suitable for testing in actual transmissions, where they performed very satisfactorily.

TABLE II

|  | K | L | M | N | O | P | Q | R | S |
|---|---|---|---|---|---|---|---|---|---|
| Components: |  |  |  |  |  |  |  |  |  |
| Polyol aliphatic ester | 35 | 35 | 42 | 42 | 40 | 40 | 40 | 37 | 37 |
| Trifluoropropylmethyl-dimethyl polysiloxane (Formula 1) | 35 | 35 | 28 | 28 | 30 | 30 | 30 | 33 | 33 |
| Fluorinated ethylene-propylene copolymer [1] | 21 |  | 21 |  | 30 |  |  | 21 |  |
| Sodium montmorillonite clay | 4 | 4 | 4 | 4 |  | 30 |  | 4 | 4 |
| Antimony diamyldithiocarbamate | 5 | 5 | 5 | 5 |  |  |  | 5 | 5 |
| Tetrafluoroethylene [2] |  | 21 |  | 21 |  |  | 30 |  | 21 |
| Test results: |  |  |  |  |  |  |  |  |  |
| Penetration: |  |  |  |  |  |  |  |  |  |
| 0 stroke | 329 | 333 | 330 | 333 |  |  |  | 324 | 327 |
| 60 strokes | 348 | 357 | 351 | 355 |  |  |  | 341 | 349 |
| 10,000 strokes | 377 | 384 | 370 | 377 |  |  |  | 360 | 371 |

[1] Copolymer of 50-50 mole percent of perfluoropropylene and tetrafluoroethylene having a density of 2.182, an average particle size of 0.15 microns, a surface area of 1.2 square meters per gram, a melting point of 570° F., and a molecular weight of 150,000.
[2] Having a molecular weight of 25,000, a density of 2.19, an average particle size of 1.0 micron, a surface area of 7.6 square miters per gram, and a melting point of greater than 600° F.

In Table II there are listed a number of compositions which contain all five of the necessary ingredients but not within the percentage range given in A and F of Table I. The purpose of this comparative data is to illustrate the advantages of the composition of the present

TABLE I

|  | A | B | C | D | E | F | G | H | I | J |
|---|---|---|---|---|---|---|---|---|---|---|
| Components: |  |  |  |  |  |  |  |  |  |  |
| Polyol aliphatic ester, percent | 38-42 | 40.0 |  | 79.0 |  | 38-42 | 40.0 |  | 79.00 |  |
| Trifluoropropylmethyl-dimethyl polysiloxane (Formula 1) | 30-32 | 31.0 | 65.0 |  | 62.0 | 30-32 | 31.00 | 65.00 |  | 62.00 |
| Fluorinated ethylenepropylene copolymer [1] | 18-21 | 19.5 | 17.0 | 8.0 | 33.0 |  |  |  |  |  |
| Sodium montmorillonite clay | 4-6 | 4.5 | 12.0 | 8.0 |  | 4.6 | 4.5 | 12.00 | 8.00 |  |
| Antimony diamyldithiocarbamate | 4-5 | 5.0 | 6.0 | 5.0 | 5.0 | 4-5 | 5.0 | 6.0 | 5.00 | 5.00 |
| Tetrafluoroethylene [2] |  |  |  |  |  | 18-21 | 19.5 | 17.00 | 8.00 | 33.00 |
| Test results: |  |  |  |  |  |  |  |  |  |  |
| Penetration: |  |  |  |  |  |  |  |  |  |  |
| 0 stroke | 290-300 | 290 | 308 | 296 | 292 | 285-300 | 288 | 312 | 309 | 295 |
| 60 strokes | 310-315 | 311 | 335 | 319 | 314 | 310-320 | 316 | 340 | 320 | 315 |
| 10,000 strokes | 335-340 | 339 | 343 | 367 | 324 | 335-340 | 340 | 345 | 370 | 330 |
| 4-ball wear at 40 kg. load, 1,200 r.p.m., 167° F., 52-100 steel, 2 hours, mm. |  |  |  |  |  |  |  |  |  |  |
| wear scar | .85-90 | .88 | 1.20 | .50 | .94 | .85-.90 | .90 | 1.18 | .5 | 1.01 |
| Mean Hertz load | 90-108 | 95 | 53 | 74 | 108 | 90-110 | 95 | 55 | 73 | 110 |
| Heat rejection: |  |  |  |  |  |  |  |  |  |  |
| Hours run |  | 5.1 | .65 | .45 | 1.0 |  | 5.1 | .75 | .50 | 1.0 |
| Temperature, ° F |  | 230 | 300+ | 300+ | 300+ |  | 230 | 300+ | 300+ | 300 |
| Time to stabilization, hours |  | 3.8 |  |  |  |  | 1.75 |  |  |  |
| Full scale transmission tests at 200 HP.: |  |  |  |  |  |  |  |  |  |  |
| Intermediate, hours run |  | 200 |  |  |  |  | 200 |  |  |  |
| Tail rotor, hours run |  | 200 |  |  |  |  | 200 |  |  |  |

[1] Copolymer of 50-50 mole percent of perfluoropropylene and tetrafluoroethylene having a density of 2.182, an average particle size of 0.15 microns, a surface area of 1.2 square meters per gram, a melting point of 570° F., and a molecular weight of 150,000.
[2] Having a molecular weight of 25,000, a density of 2.19, an average particle size of 1.0 micron, a surface area of 7.6 square meters per gram, and a melting point of greater than 600° F.

In testing the various compositions the penetration is determined in accordance with Method 313.2 of Federal Test Method Standard Number 791a. The four-ball wear is determined by Method 6514 of the same standard and the Mean Hertz Load is determined by Method 6503 invention. As indicated by the penetration data, the grease consistency of compositions K, L, M, R and S is too soft. The exceptional softness of these greases after 10,000 strokes shows that a sufficient grease structure was not achieved, and that the resultant greases lack shear stability. Some oil separation was also evident. In composition O, a grease did not form. The fluorinated polysiloxane appeared to be thickened, but the maporiaty of the ester portion of the fluid base separated out. In composition P, the fluorinated polysiloxane separated out while the ester appeared to be adequately thickened. Since there was such separation; however, there was no homogeneous grease formation. This is also true of composition Q, where the fluorinated polysiloxane portion of the base fluid appeared to have been thickened, but the ester separated out.

EXAMPLE II

The procedure of Example I is repeated with good results using in place of the polysiloxane of Example I an equal weight of the polysiloxanes having Formulas 2, 3, 4, 5 and 6, the viscosity of the polymer in each case being equivalent to that used in Example I.

EXAMPLE III

The procedure of Example I is repeated with good results using individually in place of the fluorinated copolymer of Example I an equivalent weight respectively of:

(a) 10–90 (molar) copolymer of perfluoropropylene and tetrafluoroethylene;
(b) 30–70 (molar) copolymer of perfluoropropylene and tetrafluoroethylene;
(c) 60–40 (molar) copolymer of perfluoropropylene and tetrafluoroethylene;
(d) 80–20 (molar) copolymer of perfluoropropylene and tetrafluoroethylene.

In each case the viscosity of the copolymer is similar to that of Example I.

EXAMPLE IV

The procedure of Example I is repeated with good results using in place of the fluorinated ethylene-propylene copolymer of Example I an equivalent weight of tetrafluoroethylene having a molecular weight of 10,000 to 50,000, preferably 20,000 to 30,000, and advantageously one appropriate to give a density of 2.1 to 2.3 g./cc.

EXAMPLE V

The procedure of Example I is repeated with good results by using the polysiloxanes of Example II instead of the polysiloxanes of Example I, and the tetrafluoroethylene of Example IV in place of the fluorinated ethylene-propylene of Example I.

EXAMPLE VI

The procedure of Examples I, II, III, IV and V are repeated with similar results by using in place of the antimony diamyldithiocarbamate an equal weight respectively of the corresponding dibutyl, dihexyl and dioctyl compounds.

The foregoing examples illustrate a number of grease compositions suitable for use in transmissions and gear boxes where previously only oil lubricants were able to function. While the compositions and methods herein described constitute preferred embodiments of the invention, it is to be understood that the invention is not limited to these precise compositions and methods, and that changes may be made therein without departing from the scope of the invention, which is defined in the appended claims.

What is claimed is:
1. A grease composition consisting essentially of:
(a) 38 to 42 percent by weight of a polyol aliphatic ester having the general structural formula:

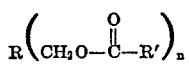

wherein R is a substituted alkane containing from one to three carbon atoms, R' is an alkyl group having from three to twelve carbon atoms, and $n$ is an integer having a value of from three to four;

(b) 30 to 32 percent by weight of a polysiloxane base oil having the general structural formula:

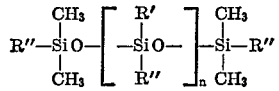

wherein R' is hydrogen or an aliphatic hydrocarbon radical having from one to three carbon atoms, R'' is methyl, ethyl, vinyl, phenyl or —CH$_2$CH$_2$R in which R represents a perfluoro radical having from one to ten carbon atoms, at least half of the R'' groups being —CH$_2$CH$_2$R, and $n$ is an integer having a value of from one to 150;
(c) 4–6 percent by weight of a montmorillonite clay thickener;
(d) 18–21 percent by weight of an additional thickener selected from the group consisting of fluorinated ethylene-propylene copolymer and tetrafluoroethylene polymer; and
(e) 4–5 percent by weight of an antimony dialkyldithiocarbamate having the structural formula:

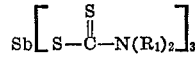

wherein R$_1$ is an alkyl group having from one to twelve carbon atoms.

2. The composition of claim 1 wherein said polysiloxane base oil is trifluoropropylmethyl-dimethyl polysiloxane having the structural formula:

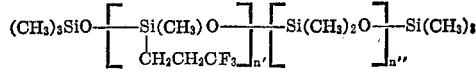

3. The composition of claim 1 wherein said montmorillonite clay is sodium montmorillonite clay.
4. The composition of claim 1 wherein said additional thickener is a copolymer of perfluoropropylene and tetrafluoroethylene.
5. The composition of claim 4 wherein said copolymer has the structural formula:

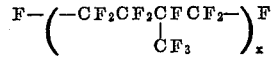

6. The composition of claim 1 wherein said antimony dialkyldithiocarbamate is antimony diamyldithiocarbamate.
7. The composition of claim 1 wherein said polyol aliphatic ester is present in the amount of 40 percent by weight, said polysiloxane base oil is trifluoropropylmethyl-dimethyl polysiloxane present in the amount of 31 percent by weight, said montmorillonite clay thickener is a sodium montmorillonite clay present in the amount of 4.5 percent by weight, said additional thickener is present in the amount of 19.5 percent by weight, and said antimony dialkyldithiocarbamate is antimony diamyldithiocarbamate present in the amount of 5.0 percent by weight.
8. The composition of claim 7 wherein said additional thickener is a copolymer of 50–50 mole percent of perfluoropropylene and tetrafluoroethylene.
9. The composition of claim 7 wherein said additional thickener is tetrafluoroethylene polymer.

References Cited
UNITED STATES PATENTS

| | | | |
|---|---|---|---|
| 3,061,545 | 10/1962 | Badger | 252—28 |
| 3,248,326 | 4/1966 | Swenson | 252—58 |
| 3,445,385 | 5/1969 | Vartanian | 252—49.6 |
| 3,622,512 | 11/1971 | Christian | 252—21 |
| 3,642,626 | 2/1972 | Christian | 252—33.6 |

DANIEL E. WYMAN, Primary Examiner

I. VAUGHN, Assistant Examiner

U.S. Cl. X.R.

252—28, 33.6

PO-1050
(5/69)

UNITED STATES PATENT OFFICE
CERTIFICATE OF CORRECTION

Patent No. 3,814,689          Dated June 4, 1974

Inventor(s) John B. Christian

It is certified that error appears in the above-identified patent and that said Letters Patent are hereby corrected as shown below:

Col. 1, following line 21, insert as a new paragraph

--A non-exclusive, irrevocable, royalty-free license in the invention herein described, throughout the world for all purposes of the United States Government, with the power to grant sublicenses for such purposes, is hereby granted to the Government of the United States of America.--.

Col. 6, Table II, next to the last line, "miters" should be --meters--.

Signed and sealed this 18th day of February 1975.

(SEAL)
Attest:

RUTH C. MASON
Attesting Officer

C. MARSHALL DANN
Commissioner of Patents
and Trademarks